(No Model.)

C. C. NEWTON.
MECHANISM FOR DRIVING SAWS.

No. 530,791. Patented Dec. 11, 1894.

WITNESSES

INVENTOR
Chas. C. Newton
By his Attorneys

UNITED STATES PATENT OFFICE.

CHARLES C. NEWTON, OF PHILADELPHIA, PENNSYLVANIA.

MECHANISM FOR DRIVING SAWS.

SPECIFICATION forming part of Letters Patent No. 530,791, dated December 11, 1894.

Application filed February 9, 1894. Serial No. 499,625. (No model.)

*To all whom it may concern:*

Be it known that I, CHARLES C. NEWTON, a citizen of the United States, residing in Philadelphia, Pennsylvania, have invented certain Improvements in Mechanism for Driving Saws, of which the following is a specification.

The object of my invention is to drive a saw for cutting cold metal direct by means of gears as fully described hereinafter.

Figure 1:
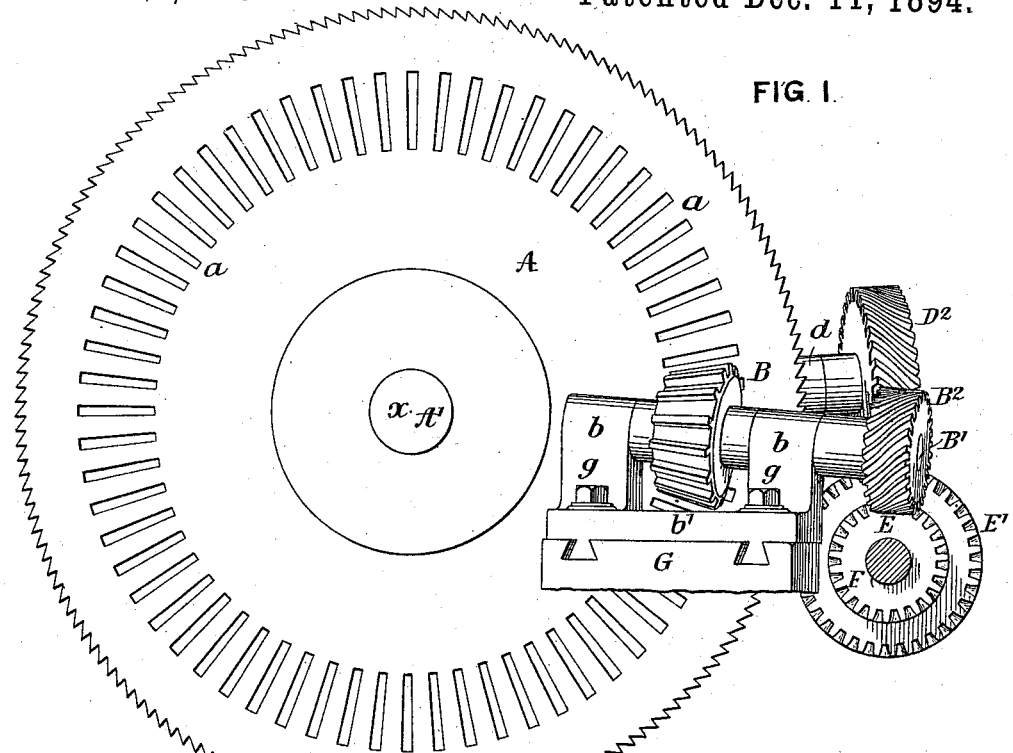
Figure 2:
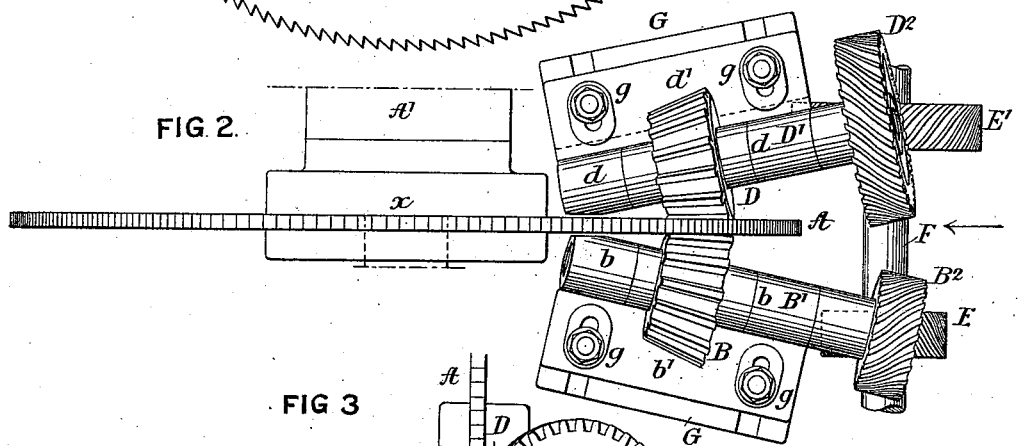

In the accompanying drawings:—Figure 1, is a side view of sufficient of a saw and the driving mechanism to illustrate my invention. Fig. 2, is a plan view, and Fig. 3, is an end view looking in the direction of the arrow, of Fig. 2.

A is the circular saw blade mounted in a suitable spindle A' and in the blade are cut, or otherwise formed, a series of radiating slots $a$ arranged in a circular path. Meshing with the ribs formed by these slots are two bevel pinions B and D mounted upon their respective shafts B' and D'. The shafts are arranged on lines radiating from the center $x$ and are mounted in suitable bearings $b$ and $d$, projecting from plates $b'$ and $d'$ adjustable toward and from the saw blade. The plates have undercut lugs adapted to undercut grooves in the fixed portion G of the machine, and are locked in position by bolts $g$.

Figure 3:
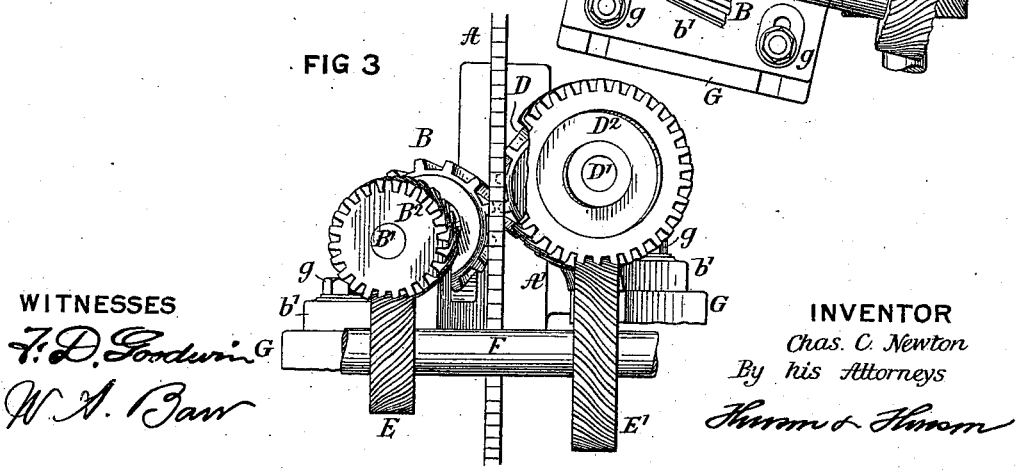

The shaft D' is set in advance of the shaft B' so that the teeth of its pinion will engage with the slotted saw blade in advance of the teeth of the pinion B, as clearly shown in Fig. 3, but the pinions are so nearly in line that one will take the thrust of the other, and thus keep the saw blade central. At the same time both pinions positively drive the saw.

On the end of the shaft B' is a spiral gear wheel $B^2$, which meshes with a similar wheel E on a driving shaft F, and on this shaft is a spiral gear wheel E' meshing with a similar wheel $D^2$ on the shaft D'.

When the driving shaft F is set in motion, the pinions B and D are driven through the spiral gears and as they mesh with the slotted saw blade, they revolve the saw, one pinion taking the thrust of the other.

While my invention relates especially to mechanism for driving circular saws for cutting cold metal, it may be utilized for other purposes as well, without departing from my invention.

The slots in the saw blade may be of other shapes without departing from my invention, but I prefer the form shown.

I claim as my invention—

1. The combination of a circular saw having a series of slots arranged in a circular path, with toothed wheels entering said slots one in advance of the other and one on one side of the blade and the other on the opposite side, substantially as set forth.

2. The combination of the slotted saw blade, the shafts B' and D' arranged on lines radiating from the center of the saw, one on each side, with toothed pinions B and D, entering the slots in the saw blade, one in advance of the other, with means for driving said shafts, substantially as set forth.

3. The combination of the slotted saw blade, the shafts B' and D' arranged in lines radiating from the center of the saw one on each side, toothed pinions on each shaft entering the slots in the saw blade one in advance of the other, spiral gear wheels on each shaft, a driving shaft F having wheels meshing with the gear wheels of the shafts B' and D' so that the said shafts will be driven at the same speed, substantially as described.

4. The combination of the slotted saw blade, the shafts B' and D', one set in advance of the other, toothed wheels on each shaft engaging with the saw blade, bearings for said shafts, said bearings being adjustable toward and from the saw blade, with means for driving the shafts, substantially as set forth.

In testimony whereof I have signed my name to this specification in the presence of two subscribing witnesses.

CHARLES C. NEWTON.

Witnesses:
H. W. CHAMPION,
E. J. HANNUM.